UNITED STATES PATENT OFFICE.

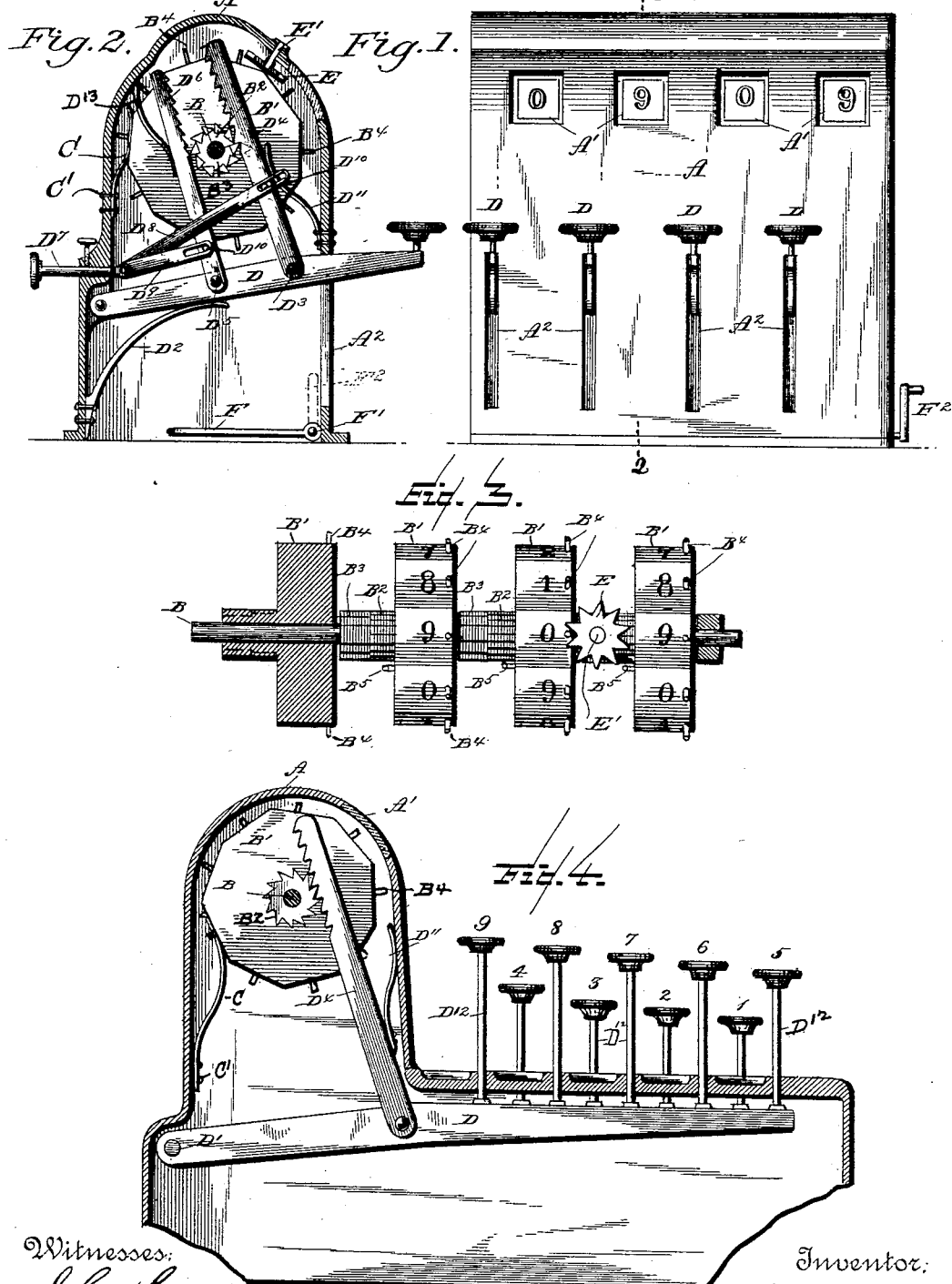

SAMUEL J. WEBB, OF MINDEN, ASSIGNOR OF ONE-HALF TO REUBEN N. McKELLAR, OF SHREVEPORT, LOUISIANA.

ADDING AND SUBTRACTING MACHINE.

SPECIFICATION forming part of Letters Patent No. 392,837, dated November 13, 1888.

Application filed January 11, 1888. Serial No. 260,402. (No model.)

*To all whom it may concern:*

Be it known that I, SAMUEL J. WEBB, a citizen of the United States, residing at Minden, in the parish of Webster, State of Louisiana, have invented certain new and useful Improvements in a Combined Adding and Subtracting Machine, of which the following is a specification, reference being had therein to the accompanying drawings.

This invention has relation to a combined adding and subtracting machine; and the objects and advantages thereof will be hereinafter described, and particularly pointed out in the claims.

Referring to the drawings, Figure 1 is a front elevation of a machine constructed in accordance with my invention. Fig. 2 is a central section on the line 2 2 of Fig. 1. Fig. 3 is a detail in front elevation of the numbering-disks; and Fig. 4 is a vertical section of a modified construction of my invention.

Like letters of reference indicate like parts in all the figures of the drawings.

A represents the casing of the machine, which is formed with sight-panels or openings A′, arranged in a series across the casing, and below said openings are formed a series of vertical slots, $A^2$, the slots corresponding in number with the openings A′. Within the casing and terminating in each side wall thereof is a fixed cross-shaft, B, upon which is loosely mounted a series of disks, B′, polygonal in cross-section, each having projecting at one side thereof serrated or toothed hubs $B^2 B^3$, Fig. 3, the teeth of the former being finer and disposed in a direction opposite to those of the latter, for a purpose hereinafter specified.

A flat spring, C, secured to the casing A, as at C′, terminates against and bears upon the disks B′, thus providing a tension therefor, it being understood that each disk is provided with a spring, C, as described.

Pivoted to the inner side of the rear wall of the casing A, and projecting through the slots $A^2$ thereof, is a key-lever, D, one for each of the disks B′. A spring, $D^2$, secured to the wall of the casing bears against the under surface of the latter and retains the same in its proper position for operation. Pivoted to the lever D, at a point in front of a central line drawn vertically through the axis of the disk B′, as shown at $D^3$, is a rack-bar, $D^4$, the teeth of which mesh with the toothed collar or hub $B^3$, and pivoted in rear of said line, as at $D^5$, is a second rack-bar, $D^6$, the teeth of which correspond in fineness and are adapted to operate in the toothed portion $B^2$ of the toothed hub. A push-rod, $D^7$, projects from the rear of the machine, and pivoted to its rear end are long and short switch-bars $D^8 D^9$, the outer ends of which are slotted and loosely connected by pins $D^{10}$ to the rack-bars $D^4 D^6$, respectively. A light spring, $D^{11}$, may be connected to the casing to bear lightly against the front face of the rack-bar $D^4$, and retain said bar in working contact with the toothed collar $B^3$, and a similar spring, $D^{12}$, projects from the casing against the rear face of the rack-bar $D^6$.

Any number of disks B′ may be employed, and in this instance I have deemed it sufficient for clear illustration to use only four. The disks represent units, tens, hundreds, and thousands, commencing with the one at the right, each of said disks being provided upon its face with a series of numerals ranging from 0 to 9, and each series of numbers being arranged in an order opposite to those on the disk adjacent, as shown in Fig. 3. A series of pegs or pins, $B^4$, corresponding in number to the numerals are arranged upon and radiate from the peripheries of the disks B′ and at one side thereof. Upon the opposite face of each disk and extending from the side wall thereof, and opposite to the zero, (or 0,) is an L-shaped pin, $B^5$.

Depending from a shaft, E, and intermediate each of the pairs of disks B′, is a loosely-mounted star or spur wheel, E, which meshes with the series of pin $B^4$ and is in the path of the L-shaped pin $B^5$. Taking the disks, for instance, in the position as shown in Fig. 3 of the drawings, in which there would appear the total of nine hundred and nine, we will suppose that it is desired to subtract one. By pressing upon the key D, companion to the units-disk—which is the one at the right of the series—said key will descend, carrying with it the rack-bar $D^4$, which will turn, through the medium of the toothed collar $B^3$, the disk B′ one notch, so as to bring the numeral 8 opposite the sight-panel in the units place and the total will be nine hundred and eight.

As thus far described it is apparent that by four disks herein shown a total up to nine thousand nine hundred and ninety-nine may be obtained. By a reference to Fig. 2 of the drawings it will be seen that by pressing the push-rod $D^7$ inwardly the rack-bar $D^4$ is thrown out of operative position with its toothed collar $B^3$, and the opposite rack-bar, $D^6$, thrown into operative position with its toothed collar $B^2$. The machine in this position is adapted for addition. Now, taking the parts as indicated, suppose, for example, it is desired to add two to the total, nine hundred and nine. By pressing upon the units key-lever so as to cause the disk $D'$ to rotate backward two degrees the numeral 1 is brought to sight, thus making the total nine hundred and eleven. As the disk turns, the L-shaped pin $B^5$ will come in contact with and cause the spur E to turn, which in turn, will throw or rotate the tens or adjacent disk one step in a forward direction, or contrary to the direction in which the units-disk is rotated, bringing the numeral 1 of the tens disk to the panel and making the total read nine hundred and eleven.

It is apparent that I may use the machine either for adding or subtracting by a simple manipulation of the push-rod $D^7$; or, if desired, I may omit the rack-bar $D^6$ and the shifting mechanism described, or vice versa, thus adapting the machine for subtraction or addition.

An arm, F, pivoted to the base of the machine, as at $F'$, and formed with an operative crank, $F^2$, may be provided, whereby when swung in a vertical position it wedges under the keys or levers D, thus preventing accidental movement of the levers and consequent disturbance of the total.

As shown in Fig. 4 of the drawings, which is a modification of the arrangement of the operating mechanism, it will be seen that the bar D is formed longer than in the previous construction, and that there extends upwardly therefrom, or it may be, bears loosely thereon, a series of keys, $D^{12}$, mounted in a key-board, the keys being graduated in length and growing shorter as they approach the outer end of the bar. By a suitable proportioning and mounting of the keys with relation to the point of pivotal attachment of the lever D each key may be made to throw the numeral on the disk to which it belongs to the opening, so that if it is desired to add or subtract a nine the key representing that numeral which would be the longest and one nearest the pivot of the lever D is struck, and this causes the disk to rotate nine degrees, thus avoiding the necessity of counting the number of spaces passed, which is the case where but a single lever is used for each disk.

It is apparent that by changing the order of the numerals as arranged upon the faces of the disks the operations necessary to add and subtract may be reversed.

Having described my invention and its operation, what I claim is—

1. In a machine of the class described, a series of disks provided with a hub having oppositely-disposed teeth, in combination with a key-lever carrying pivoted rack-bars, one for each set of teeth, and means for throwing either of said rack-bars into or out of connection with said collar, substantially as specified.

2. In a machine of the class described, a series of disks mounted upon a shaft and having oppositely-disposed toothed hubs, in combination with a key-lever carrying two rack-bars adapted to engage with said hubs, and a push-rod having pivoted levers loosely connected with the rack-bars, whereby either may be thrown into and out of connection with the hubs, substantially as specified.

3. The casing A, having the openings $A'$, and vertical slots $A^2$, in combination with the shaft B, carrying the disks $B'$, arranged opposite the openings $A'$ of the casing and having toothed hubs $B^2$ $B^3$, and the key-levers B, carrying rack-bars $D^4$ $D^6$, the push-rod $D^7$, and the switch-bars $D^8$ $D^9$, loosely connected with said rack-bars, substantially as specified.

4. The casing A, having the disks $B'$, the shaft B, carrying the sleeves $B^2$ $B^3$, in combination with the key-lever D, pivoted as at $D'$ to the casing, the spring $D^2$, bearing against said lever, the pivoted rack-bars $D^4$ $D^6$, having the springs $D^{11}$ $D^{13}$, respectively, and the switch-bars $D^8$ $D^9$, loosely connected with said rack-bars, as at $D^{10}$, and having their opposite ends pivoted to a push-rod, $D^7$, substantially as specified.

In testimony whereof I affix my signature in presence of two witnesses.

SAMUEL J. WEBB.

Witnesses:
W. S. DUVALL,
HEATH SUTHERLAND.